No. 786,367. PATENTED APR. 4, 1905.
I. L. LANDIS.
MOLDING MACHINE.
APPLICATION FILED NOV. 9, 1904.
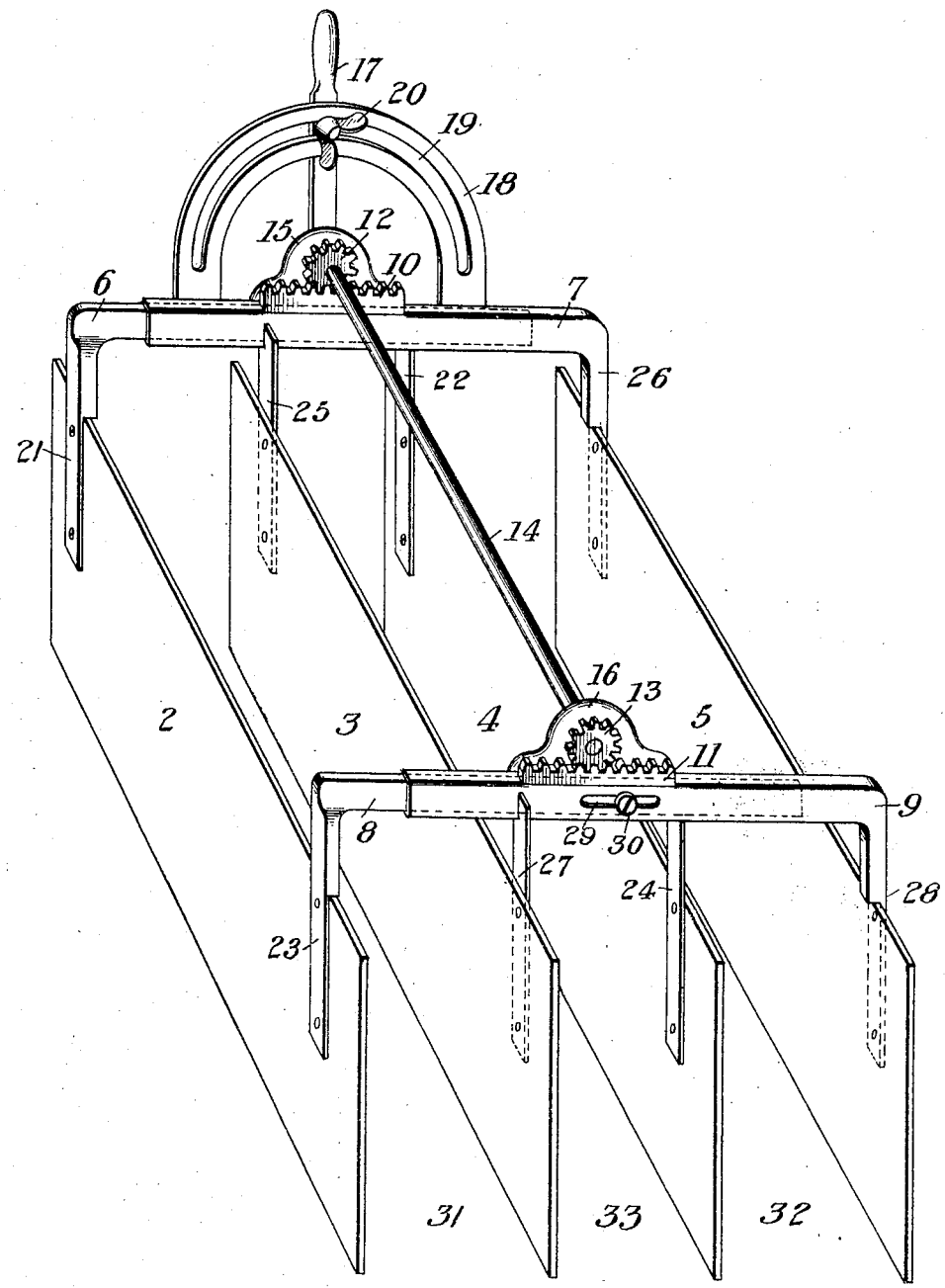
Witnesses.
Lawrence J. Saurrehon
J. Wilson Brown
Inventor.
Israel L. Landis
By J. Warner Peckstron
Atty.

No. 786,367.

Patented April 4, 1905.

UNITED STATES PATENT OFFICE.

ISRAEL L. LANDIS, OF CHICAGO, ILLINOIS.

MOLDING-MACHINE.

SPECIFICATION forming part of Letters Patent No. 786,367, dated April 4, 1905.

Application filed November 9, 1904. Serial No. 231,975.

*To all whom it may concern:*

Be it known that I, ISRAEL L. LANDIS, a citizen of the United States, residing at Chicago, Cook county, Illinois, have invented certain new and useful Improvements in Molding-Machines, of which the following is a specification.

My invention relates to improvements in molds for building walls of concrete or plastic material, and has particular reference to mechanisms for operating or moving simultaneously the sides of a mold.

The object of my invention is to provide improved means for moving the sides of a mold or mold-boards toward and from each other, adaptable to molds of great length as well as short molds and always operable by a single lever no matter what may be the length of the mold.

Another object of the invention is to provide a mold equally suited for making solid or hollow walls and quickly adjustable or adaptable to form walls of a variety of thicknesses without disturbing the operating mechanism associated with the mold-boards.

Other objects and advantages of the invention will be pointed out in the following description, and its novel meritorius features will be incorporated in the annexed claims.

Reference is to be had to the accompanying drawing, forming part of this specification, in which the figure is a perspective view of a machine embodying my invention.

Referring in detail to the drawing, 2, 3, 4, and 5 are mold-boards arranged in parallel relation.

6 7 and 8 9 are yokes. The yokes 7 and 9 are of channel form and in their channels the yokes 6 and 8 are slidably adjustable. The yokes 7 and 9 carry on their upper flanges gear-racks 10 and 11, respectively, engaging pinions 12 and 13, mounted rigidly on the ends of a shaft 14, journaled in bearings 15 and 16, projecting upwardly from the yokes 6 and 8. On one end of the shaft 14 is keyed a lever 17, which is normally clamped fast in a given position in its semicircular path of rotation against an arch 18, having a semicircular slot 19, through which passes a screw 20, having threaded engagement with the lever 17. The yoke 6 has downwardly-extending arms 21 22, bolted or screwed fast to moldboards 2 and 4. The yoke 8 has similar arms 23 and 24, also secured to said boards 2 and 4, but near their opposite ends. The yokes 7 and 9 have similar arms 25 26 and 27 28, secured to the boards 3 and 5. The latter therefore move together in one direction, while the boards 2 and 4 move together in the opposite direction when shaft 14 is rotated by means of lever 17. In the vertical side of the channel-yoke 9 is a slot 29 for a screw 30, which has threaded engagement with the yoke 8 and prevents separation laterally of yokes 8 and 9. Yokes 6 and 7 may be similarly bound together, though this is not ordinarily necessary, as the shaft 14 connects yokes 7 and 9, whose bearings 15 and 16 may be arranged to engage the shaft 14 so that it will not move longitudinally. The shaft 14 being held in bearings secured to the yokes 6 and 8, slidable in the channels of yokes 7 and 9, and the latter carrying the racks 10 and 11, meshing with the pinions 12 and 13, it is obvious that when the latter are rotated the yokes 7 and 9 will be slid longitudinally of the yokes 6 and 8, and as the yokes 7 and 9 carry the mold-boards 3 and 5 said mold-boards will move toward or away from the mold-boards 2 and 4, according to the direction in which lever 17 is moved, thereby either expanding the spaces 31 32 between boards 2 3 and 4 5, respectively, and contracting the space 33 between boards 3 and 4, or vice versa.

As none of the operating mechanism depends upon any of the mold-boards for its support, said boards may be employed either as one pair or two pairs, and when one pair only is employed for building solid walls a considerable variety of thicknesses of such walls may be made with the same machine. As a comparatively slight rotation of the lever 17 is necessary in order to loosen the mold-boards, the balance of its range of movement may be utilized for attaining a more exact adjustment of the boards laterally or for gaging the size of the mold space or spaces.

A series of mold-boards provided with the operating mechanism described in the foregoing may be as long as the full length of the wall of the building in course of construction and yet operable by the single lever to move both ends of the mold simultaneously. It is merely a question of length of shaft 14 to adapt my invention to any desired length of mold-boards.

In molding hollow walls the spaces between boards 2 and 3 and between boards 4 and 5 are filled with concrete or the like. After the latter has partly set or been properly tamped or packed the lever 17 is rotated to the left, which will cause mold-board 3 to move into the hollow space between boards 3 and 4 or to be moved closer to mold-board 4. Mold-board 5 will simultaneously be moved outward away from the newly-constructed wall-section or away from mold-board 4, and the mold will thus be freed from the wall and ready to be moved into a new position to repeat the operation.

By arranging the operating mechanism above the mold-boards I am enabled to operate the mold in narrow spaces too confined to permit the operator to stand by the side of the mold or to permit an operating mechanism to be partly arranged on one side thereof.

I am aware of molding-machines employing screws and nuts for moving the mold-boards; but such mechanism is objectionable, because concrete or cement will invariably be spilled upon the screws in filling the mold and become wedged between the threads of nut and screw and bind same together against relative movement. The grit will also quickly grind out the threads, with the result that the machine is quickly worn out.

What I claim as new, and desire to secure by Letters Patent, is—

1. In a molding-machine, a series of mold-boards arranged in parallel relation, pairs of yokes supporting said mold-boards, one member of each pair of yokes slidable upon its companion member, a rotary shaft paralleling said mold-boards, said shaft mounted upon one member of each pair and having pinions engaging racks on the companion members.

2. A molding-machine having a pair of sides arranged parallel, two pairs of yokes for supporting the opposite ends of said sides, the members of each pair arranged to slide upon each other, a rotary shaft journaled in bearings upon one member of each said pair of yokes, gear-racks upon the other members of said pairs, pinions keyed upon said shaft to mesh with said racks and a lever for rotating said shaft.

3. A molding-machine having sides or mold-boards arranged parallel, two pairs of yokes supporting the ends of said sides, the members of each pair of yokes arranged to slide upon each other, a rotary shaft having a lever and pinions keyed thereupon, said shaft journaled upon one member of each pair of yokes, a slotted arch fixed upon one member of one pair of yokes, means for clamping said lever to said arch at any point in its path of rotation, and toothed racks upon the companion members of said pairs of yokes, arranged to mesh with said pinions.

4. In a molding-machine, two series of members arranged to move in opposite parallel directions, a lever-operated shaft journaled on one of said series of members, pinions on said shaft, racks engaging said pinions, mounted on the other series and a series of mold-boards secured to said members.

5. In a molding-machine, a plurality of pairs of members, each pair comprising a stationary bar and a movable bar, the latter slidable upon the former, a toothed rack mounted on one member of each pair, a rotary shaft and pinion mounted on the other member of each pair, a lever for rotating said shaft, means for locking said lever against movement in any radial position along its path of movement, and mold-boards mounted on said pairs of members.

6. In a molding-machine, a plurality of pairs of members, each pair comprising a stationary bar and a movable bar, the latter slidable on the former, a shaft journaled on the stationary bars, gear-racks mounted on the movable bars, pinions keyed to said shaft and engaging said racks, a lever for rotating said shaft, a support, means for clamping said lever to said support, and mold-boards upon said members.

7. In a molding-machine, a plurality of pairs of members, each pair comprising a stationary bar and a channel-bar, the latter slidable in the channel on the former, a slot in each channel-bar, a headed pin, engaging said slot, on each stationary bar, said pin and slot holding the members of each pair together against lateral movement relatively to each other while permitting relative longitudinal movement, a lever-operated rack-and-pinion mechanism for moving the members of each pair in opposite parallel directions, and mold-boards mounted on said members.

In testimony whereof I have hereunto set my hand in the presence of two subscribing witnesses.

ISRAEL L. LANDIS.

Witnesses:
JOHN T. THOMPSON,
GEORGE S. MACKENZIE.